March 13, 1973   E. R. GAMBLE   3,720,329
PALLETIZED CARGO TRAILER

Filed March 16, 1971

INVENTOR.
BY *EDWARD R. GAMBLE*
*Charles G. Lamb*
ATTORNEY.

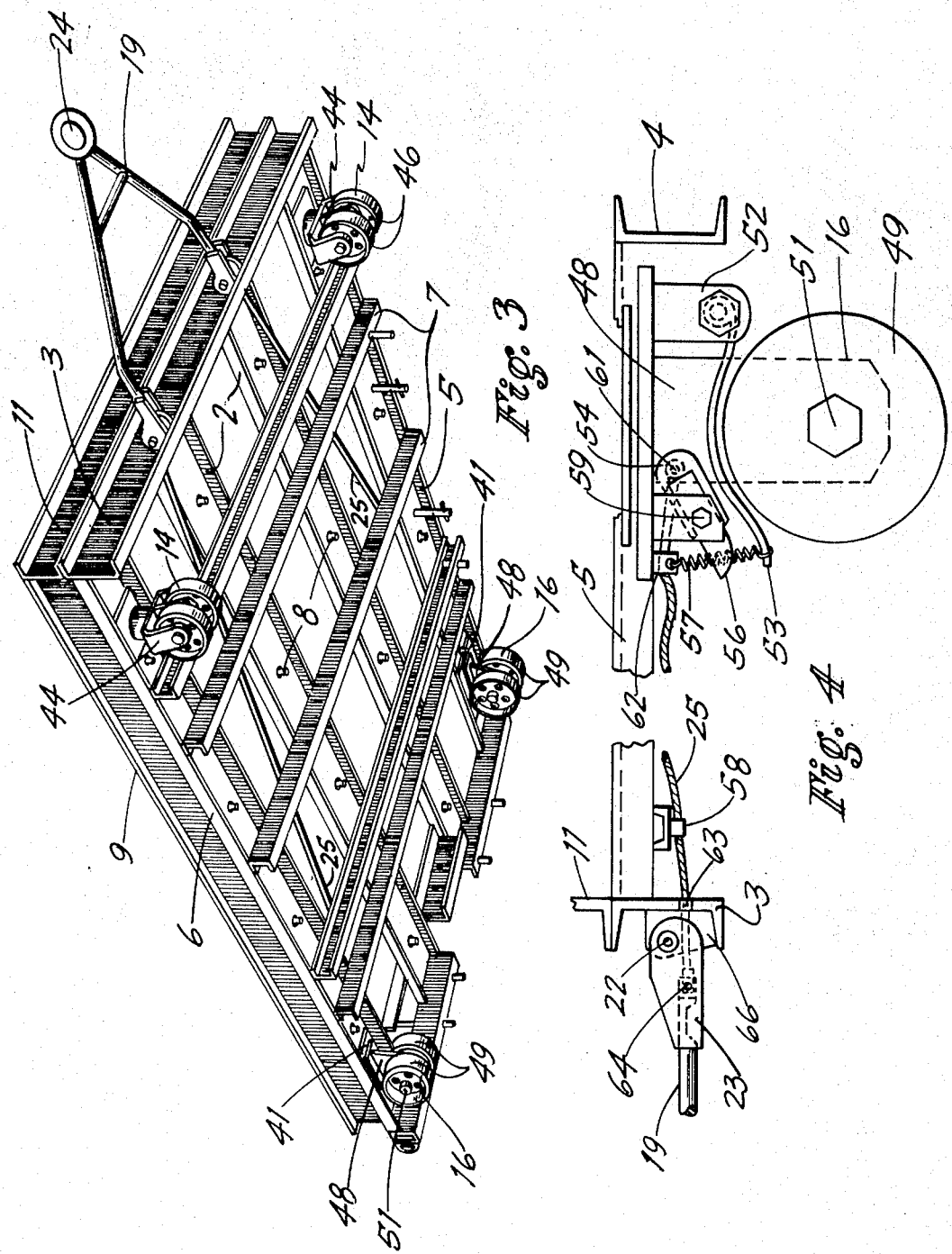

March 13, 1973 E. R. GAMBLE 3,720,329
PALLETIZED CARGO TRAILER
Filed March 16, 1971 4 Sheets-Sheet 3
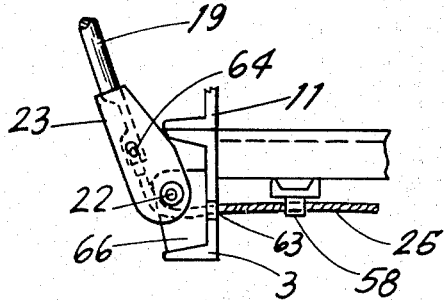
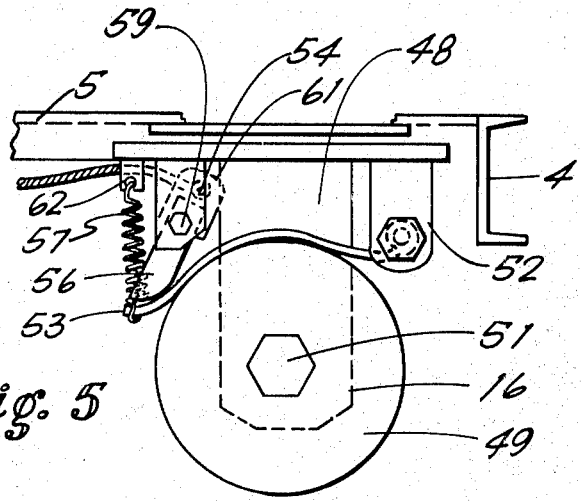
Fig. 5
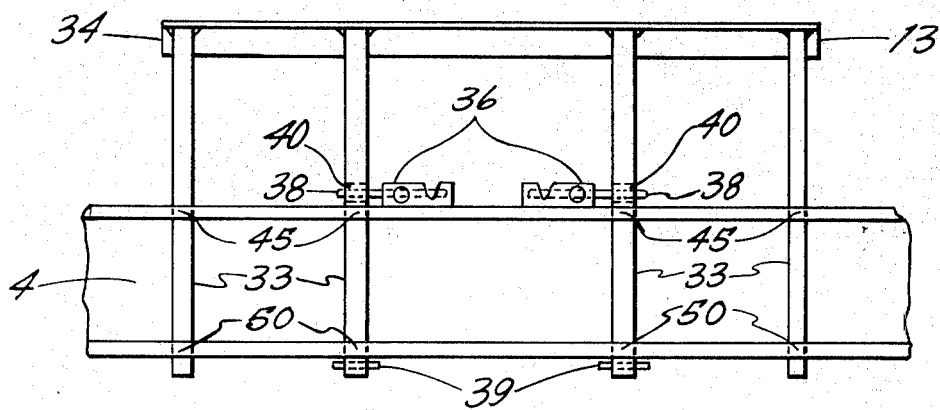
Fig. 6
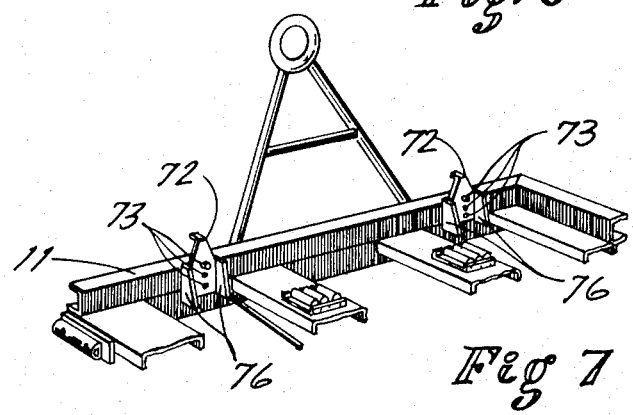
Fig 7
INVENTOR.
BY EDWARD R. GAMBLE
Charles G. Lamb
ATTORNEY March 13, 1973  E. R. GAMBLE  3,720,329
PALLETIZED CARGO TRAILER Filed March 16, 1971  4 Sheets-Sheet 4

INVENTOR.
BY EDWARD R. GAMBLE
Charles G. Lamb
ATTORNEY

United States Patent Office 3,720,329
Patented Mar. 13, 1973

3,720,329
PALLETIZED CARGO TRAILER
Edward R. Gamble, Clayton, Mo., assignor to American Air Filter Company, Inc., Louisville, Ky.
Filed Mar. 16, 1971, Ser. No. 124,850
Int. Cl. B60p 1/52
U.S. Cl. 214—84                                          10 Claims

ABSTRACT OF THE DISCLOSURE

A cargo trailer usable for pallets, and the like, having a platform mounted on wheels. The front end is provided with a tow bar as means for coupling to transporting means for the cargo trailer and actuating wheel brake means. The cargo trailer further provides for track members which fit fork lifts so that said cargo trailers may also be transported by said fork lifts.

BACKGROUND OF THE INVENTION

Material handling devices for transporting pallets, carts, containers, and the like, are well-known in the prior art. Most of these devices have been discovered to solve or improve upon specific problems as these problems arise. For example, U.S. 2,535,457 teaches a moving truck for furniture and other heavy objects utilizing wide rollers for engaging a supporting surface to distribute the weight borne by the truck over a maximum area. Further, this reference teaches the use of handles for pulling and lifting the truck. U.S. 3,137,250 teaches a material handling device of flat bed structure having swivelly and fixedly attached wheel members. Further, sockets are provided for receiving posts whereby a plurality of flat bed structures may be assembled to form a shelf structure. U.S. 2,557,183 relates to hand trucks and to braking means for said trucks which may be controlled by draft handles which are attached to the body of said trucks. These are only a few of the many devices known in the prior art for handling materials, each one solving or improving upon very special problems.

SUMMARY OF THE INVENTION

In the present invention, it is recognized that it is desirable to provide a material handling device which will handle pallets, and the like. Furthermore, it is recognized that it is desirable to provide a material handling device which may be moved by towing or lifting means.

The present invention advantageously provides a straight forward device for handling pallets and other similar forms of cargo whereby said pallets or cargo may be transported by towing means or lifting means. The present invention further provides brake means for use with towing means.

Various other features of the present invention will become obvious to those skilled in the art upon reading the disclosure set forth hereinafter.

More particularly, the present invention provides a cargo trailer comprising: a platform having two sides, a front and a rear end; wheel members attached to and extending downwardly from said platform; a tow bar pivotally attached to said fron tend of said platform and extending upwardly therefrom; and, brake means attached in engaging and disengaging relationship with at least one wheel member and actuated by said tow bar.

FIG. 3 is a perspective view looking toward the underside of the cargo trailer of FIG. 1;

FIG. 4 is a fragmentary detail view of the brake means for the cargo trailer of FIG. 1;

FIG. 5 is a fragmentary detail view of the brake means of FIG. 4 in a braking position;

FIG. 6 is an elevational view of the retractable rails of the cargo trailer of FIG. 1;

FIG. 7 is a partial perspective view of the front of a cargo trailer of FIG. 1;

Figure 1:
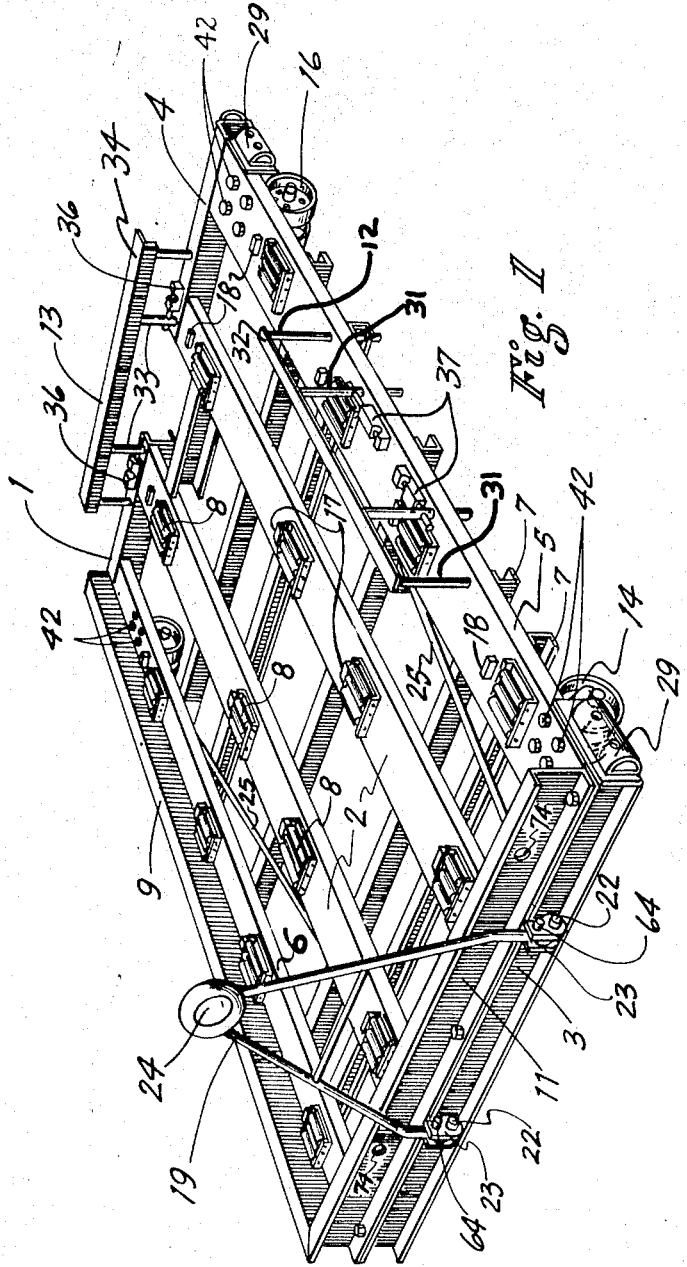
FIG. 1 is a perspective view of a cargo trailer in accordance with the present invention.

As may be seen from FIG. 1, the cargo trailer of the present invention comprises a platform 1 which includes a plurality of longitudinal support members 2 extending from transverse end member 3 at the front end to transverse end member 4 at the rear end. Two side members 5 and 6 are also provided to extend from transverse end member 3 to transverse end member 4. Platform 1 further includes a plurality of elongated transverse support members 7 to add extra support to longitudinal support members 2 and side members 5 and 6. Moreover, transverse support members 7 are spaced and adapted to receive forks (not shown) of fork lifts.

Fixedly attached to the platform 1 is upwardly extending side member 9 and upwardly extending front end member 11. Upwardly extending member 9 is in communicative relation with side member 6 and upwardly extending member 11 is in communicative relation with end member 3. Retractably attached to the platform 1 are retractable load guards 12 and 13. Load guards 12 and 13 restrict the movement of cargo during movement of the trailer.

Retractable load guard 12 is provided with vertically extending members 31 which are received in retractable relationship by side member 5. Transversely extending member 32 is fixedly attached to the vertically extending members 31 at their upper extremity. The vertically extending members 31 are adapted with means, which will be discussed hereinafter, for positioning guard 12 at different elevations.

Retractable load guard 13 is provided with vertically extending members 33 which are received in retractable relationship by transverse end member 4. Transverse extending member 34 is fixedly attached to the vertically extending members 33 at their upper extremity. The vertically extending members 33 are adapted with means, which will be discussed hereinafter, for positioning guard 13 at different elevations.

FIG. 6 illustrates, in detail, retractable load guard 13 in order to show one means of positioning of the load guards of the present invention. At least two of the vertically extending members 33 are provided with stop means 39 at their lower extremity for prevention of withdrawing the load guard 13 from the cargo trailer. Stop means 39 are not essential but are preferred. Apertures 40 are selectively spaced along members 33 to line up with and receive bolt 38 when the load guard 13 is in an extended position. Bolt 38 is further adapted to be received by latch 36. Latches 36 are fixedly attached to the transverse end member 4 at selected positions in line with apertures 40 when the guard 13 is in the aforementioned extended position. It is also possible to have a plurality of apertures 40 in a single member 33 wherein the extended position of the load guard 13 may be at different elevations.

In operation of the retractable load guard 13, when cargo has been loaded onto the platform 1, guard 13 is pulled up through transverse end member 4, transverse end member 4 having apertures 45 and 50 to receive the vertically extending members 33 of the guard 13. Stop means 39, being adapted so that it will not pass through aperture 50, stops the guard 13 from being pulled out of the transverse end member 4. Stop means 39 is further adapted so that when it contacts the underside of member 4, aperture 40 of the vertically extending member 33 is in horizontal alignment with latch 36. Bolt 38 is then inserted through aperture 40 and held in position by latch 36. Bolt 38 prevents guard 13 from retracting downwardly during towing of the trailer. Whenever it is desired to unload or load the trailer, bolt 38 is manually removed from aperture 40 thereby allowing the guard 13 to retract downwardly through apertures 45 and 50. Downward retraction of guard 13 is stopped when transverse extending member 34 contacts the topside of transverse end member 4.

Figure 2:
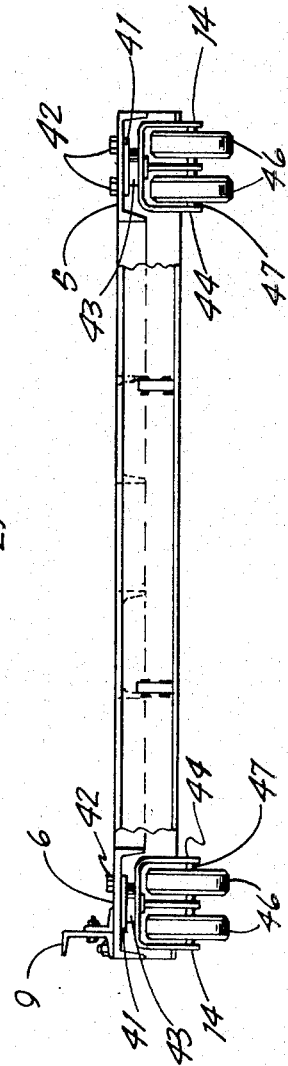
FIG. 2 is a front end elevational view of the cargo trailer of FIG. 1 without the tow bar.

Wheel assemblies 14 and 16 (FIGS. 1 and 3) may be secured to the platform 1 in any desired arrangement and combination due to the provision of the aligned apertures or bolt holes in the platform 1. Each of these assemblies are secured to a flat plate 41 (FIG. 2) having a plurality of apertures (not shown) which are alignable with corresponding apertures (not shown) in the platform 1 whereby the flat plates 41 may be easily secured to the platform 1 in any one of a plurality of different positions by bolts 42. One preferred arrangement of the wheel assemblies 14 and 16 as shown in FIG. 3 is to swivelly mount the wheel assemblies 14 at the front of the platform 1 and fixedly mount the wheel assemblies 16 at the rear of the platform 1. Wheel assemblies 14 and 16 are secured at the front and rear ends of side members 5 and 6, each side member having a wheel assembly 14 and a wheel assembly 16.

The wheel assemblies 14 (FIG. 2) include a flat plate 41 and a swivel plate 43 rotatably secured thereto in the usual manner for rotation about a vertical axis. A bracket 44 in turn is rigidly secured to the swivel plate 43 and supports wheel members 46 by means of a shaft 47 which extends through aligned apertures (not shown) in the arms of bracket 44. The wheel assemblies 16 (FIG. 3) have a T-shaped member 48 extending downwardly from their fixed plates 41 and support wheel members 49 by means of a shaft 51 which extends through aligned apertures (not shown) in the T-shaped members 48.

Rotatable rollers 8 (FIG. 1) are provided and are retractably mounted at desired locations on platform 1. Stop means 17 and 18 are provided to restrict the rotation of rotatable rollers. Stop means 17 and 18 are secured to the longitudinal support members 2 and side members 5 and 6.

Stop means 18 for rotatable rollers 8 are spaced from the rollers 8 and adapted so that the rollers 8 may be rotated slightly to assist in loading. Stop means 18 are provided for the rollers 8 which are adjacent the retractable rails 12 and 13. These include the rollers 8 mounted onto side member 5 and the rollers 8 mounted at the rear ends of longitudinal support members 2 and side member 6. Stop means 17 for rotatable rollers 8 are in abutting relationship to prevent any pivoting of the rollers 8. The stop means 17 are positioned at the remaining rollers 8 mounted onto support members 2 and side member 6.

A tow bar 19 (FIGS. 1, 4, and 5) is pivotally mounted to transverse end member 3 by means of coupling 23 and bracket 66. Bracket 66 is secured, for example, by welding to transverse end member 3 and is attached to coupling 23 by shaft 22. The coupling 23 supports the tow bar 19 for pivotal action about shaft 22 which extends essentially along a horizontal axis whether the tow bar 19 is in a vertical position, as shown in FIGS. 1 and 5, or a horizontal position, as shown in FIGS. 3 and 4. Tow bar 19 is further provided with hitch means 24, which is illustrated in FIG. 1 as an eyelet, for hitching the trailer to pulling means (not shown). Tow bar 19 is attached to brake means, which will be discussed hereinafter, through cable means 25 wherein the trailer is in braking position when tow bar 19 is in a vertical position (FIG. 5) and non-braking position when tow bar 19 is in a non-vertical position (FIG. 4).

A rear bumper guard 28 (FIG. 9) is fixedly attached to the transverse end member 4 which is in communicative relation with side member 5. Side bumper guards 29 (FIG. 1) are fixedly attached and spaced at opposite extremities of side member 5 and extend in an outwardly direction. Bumper guards 28 and 29 are provided to protect the interior sides of aircraft, railroad cars, and the like from damage when the trailer is being transferred.

FIGS. 4 and 5 illustrate one means of braking the cargo trailer of the present invention. In the figures it is seen that cables 25 are attached to tow bar 19 by means of shaft 64 which passes through coupling 23, tow bar 19, and each cable 25. Shaft 64 extends essentially along a horizontal axis whether the tow bar 19 be in a vertical position, as shown in FIG. 5, or a horizontal position, as shown in FIG. 4. Cables 25, only one being illustrated, are adapted to be positioned on the underside of the platform 1 and in a direction toward each rear wheel assembly 16. Cable supports 58 are fixedly attached to the underside of the platform 1 and are positioned at selected points to support cable 25. Cable supports 58 are illustrated as brackets having a ring attached for passing cable 25 therethrough. Cable 25 at its rear extremity is attached to a lever arm 54 by shaft means 61. Lever arm 54 is in turn connected to cam 56 by bolt means 59.

A brake shoe 53 is provided for braking each wheel member 49 of the rear wheel assemblies 16. Brake shoe 53 is attached at one end to a spring 57 and at the opposite end to a brake shoe bracket 52. Spring 57 is attached to bracket 62 which is in turn fixedly attached to T-shaped member 48. Brake shoe bracket 52 is also fixedly attached to T-shaped member 48.

In the operation of the brake means, when tow bar 19 is in a vertical or braking position, cable 25 is pulled forward from the rear thereby pulling lever arm 54 upwards. As lever arm 54 moves upwards, cam 56 moves downwards contacting brake shoe 53 forcing brake shoe 53 downwards thereby contacting wheel member 49. Pressure of brake shoe 53 on wheel member 49 prevents movement of wheel member 49 when tow bar 19 is in a vertical position.

When tow bar 19 is positioned for towing, tension on cable 25 is relaxed thereby releasing the upward pull on the lever arm 54. As lever arm 54 is released cam 56 which forces brake shoe 53 downwards releases its force on shoe 53 and spring 57, which is attached to shoe 53, pulls shoe 53 away from wheel member 49, thereby permitting movement of wheel member 49 in the direction of pull of the platform 1.

Figure 8:
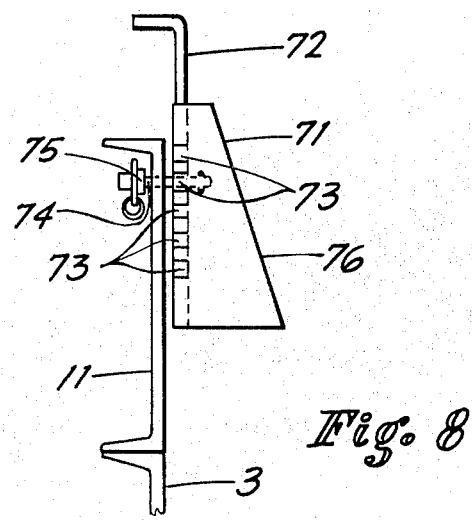
FIG. 8 is an elevational view of the load wedge of the cargo trailer of FIG. 1; and, FIG. 9 is a partial perspective view of the rear of a cargo trailer of FIG. 1.

FIGS. 7 and 8 illustrate one load wedge utilized in the present invention for preventing a load of cargo from shifting on the platform 1 during towing of the trailer. The load wedge 71 includes a handle 72 having a plurality of apertures 73 disposed therethrough, a quick release pin 75 adaptable for passage through aperture 74 and aperture 73, and wedge members 76. In operation, load wedge 71 is pressed in a downward direction and quick release pin 75 is inserted through the uppermost aperture 73. Platform 1 is then loaded. After the loading, quick release pin 75 is removed and the load wedge 71 is then pulled upwards until the load is secured. Quick release pin 75 is then inserted through the appropriate aperture 73 so the load will not shift forwards during towing.

Figure 9:
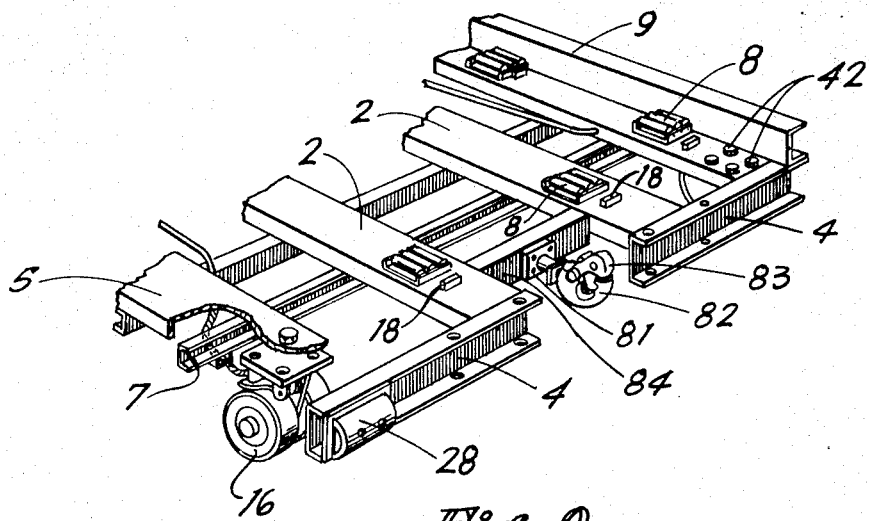

FIG. 9 illustrates one means of coupling cargo trailers of the present invention so that several cargo trailers may be pulled by one pulling means. The coupling means illustrated is a pintle hook assembly which includes a hook 82, a spring loaded lock assembly pintle 83, and a support plate 81 mounted onto transverse support member 84. Member 84 is attached at right angles to longitudinal support members 2. In operation, hitch means 24 of one trailer is detachably attached to the pintle hook assembly of a second trailer by pulling upwards the spring loaded lock pintle assembly 83 and attaching hitch means 24 to hook 82. Lock pintle assembly 83 is then released and the hitch means 24 is secured.

While a preferred embodiment of the invention has been described, modifications may be made and it is intended in the following claims to cover all such modifications as fall within the true spirit and scope of the invention.

What I claim is:

1. A cargo trailer comprising:
   (a) A platform having two sides, a front end and a rear end, said platform including a plurality of longitudinal support members having a top and a bottom and spaced between the sides, a plurality of elongated transverse support members affixed to and extending transversely beneath said sides and said longitudinal support members, and spaced in parallel relationship to each other to support said side members and said longitudinal support members, said elongated transverse support members being spaced to receive forks of a fork lift;
   (b) wheel members attached to and extending downwardly from said platform;
   (c) a tow bar pivotally attached to said front end of said platform and extending upwardly therefrom;
   (d) brake means attached in engaging and disengaging relationship with at least one wheel member and actuated by said tow bar; and,
   (e) roller means attached to said longitudinally extending support members, said roller means being rotatable and retractably mounted onto said longitudinally extending support members, said longitudinal extending support members having selected stop means for said roller means at selected spacing from said roller means whereby selected roller means may be rotated to assist in loading and unloading.

2. The cargo trailer of claim 1 wherein one side extends upwardly from said platform and said front end extends upwardly from said platform.

3. The cargo trailer of claim 2 wherein an opposite side has a retractable load guard to extend upwardly from said platform and said rear end has a retractable load guard to extend upwardly from said platform.

4. The cargo trailer of claim 3 wherein said retractable load guards have vertically extending members which are received by said opposite side and said rear end by aperture means and said vertically extending members are adapted with means for positioning said retractable load guard at different elevations.

5. The cargo trailer of claim 1, said wheel members including at least three wheels, at least one wheel member being swivelly attached to the front end of said platform and at least one wheel member being fixedly attached to the rear end of said platform.

6. The cargo trailer of claim 5 wherein said brake means are attached in engaging and disengaging relationship with said wheel member fixedly attached to the rear end of said platform.

7. The cargo trailer of claim 1 wherein said brake means is actuated by said tow bar through cable means, said cable means being fixedly attached to said tow bar at one extremity and fixedly attached to said brake means at the other extremity whereby the position of said tow bar determines the engaging and disengaging relationship of said brake means with at least one said wheel member.

8. The cargo trailer of claim 1 including a load wedge.

9. The cargo trailer of claim 1 including means to couple one cargo trailer to a second cargo trailer.

10. The cargo trailer of claim 9 wherein said means to couple is a pintle hook assembly.

References Cited

UNITED STATES PATENTS

| | | | |
|---|---|---|---|
| 3,243,062 | 3/1966 | Frassetto | 214—84 |
| 3,313,378 | 4/1967 | Freeman et al. | 280—486 X R |
| 3,393,784 | 7/1968 | Dohanyos | 214—84 X R |
| 3,435,969 | 4/1969 | McCartney et al. | 214—84 |
| 3,514,001 | 5/1970 | DeMeritt et al. | 214—84 X R |

ALBERT J. MAKAY, Primary Examiner

U.S. Cl. X.R.

188—3; 280—79.1